United States Patent

Ozawa

(10) Patent No.: US 9,753,907 B2
(45) Date of Patent: Sep. 5, 2017

(54) INFORMATION PROCESSING APPARATUS, PRINTING APPARATUS, INFORMATION PROCESSING METHOD AND STORAGE MEDIUM FOR PRINTING CHARACTER INCLUDING PLURALITY OF PARTS

(71) Applicant: CASIO COMPUTER CO., LTD., Tokyo (JP)

(72) Inventor: Takeo Ozawa, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/072,718

(22) Filed: Mar. 17, 2016

(65) Prior Publication Data

US 2016/0378740 A1 Dec. 29, 2016

(30) Foreign Application Priority Data

Jun. 24, 2015 (JP) ................................. 2015-127122

(51) Int. Cl.
*G06K 15/02* (2006.01)
*G06F 17/24* (2006.01)
*G06F 17/28* (2006.01)

(52) U.S. Cl.
CPC .......... *G06F 17/24* (2013.01); *G06F 17/2863* (2013.01); *G06K 15/1827* (2013.01)

(58) Field of Classification Search
None
See application file for complete search history.

(56) References Cited

U.S. PATENT DOCUMENTS

| 5,680,520 A | * | 10/1997 | Watanabe | B41J 3/4075 345/471 |
| 5,984,545 A | * | 11/1999 | Watanabe | G06F 17/211 345/471 |
| 6,226,094 B1 | * | 5/2001 | Watanabe | G06F 17/214 358/1.11 |
| 6,654,495 B1 | * | 11/2003 | Katoh | G06K 9/346 382/178 |
| 7,095,403 B2 | * | 8/2006 | Lyustin | G06F 3/018 341/28 |
| 2003/0112224 A1 | * | 6/2003 | Pan | G06F 3/018 345/171 |
| 2010/0302164 A1 | * | 12/2010 | Pienimaa | G06F 3/018 345/168 |
| 2011/0134454 A1 | * | 6/2011 | Hosokawa | G06F 17/24 358/1.13 |

FOREIGN PATENT DOCUMENTS

| JP | H07-078049 A | 3/1995 |
| JP | H11-353096 A | 12/1999 |
| JP | 2003-196010 A | 7/2003 |
| JP | 2009-103736 A | 5/2009 |

* cited by examiner

*Primary Examiner* — Miya J Williams
(74) *Attorney, Agent, or Firm* — Scully, Scott, Murphy & Presser, P.C.

(57) ABSTRACT

An information processing apparatus includes an input unit, a display unit, a designation unit and an update unit. The input unit inputs a plurality of parts configuring one character. The display unit displays the plurality of parts. The designation unit designates one or more parts selected from the plurality of parts by a user. The update unit updates a display on the display unit such that the designated one or more parts are deleted from the one character and the other parts are remained displayed on the display unit.

17 Claims, 9 Drawing Sheets

INFORMATION PROCESSING APPARATUS, PRINTING APPARATUS, INFORMATION PROCESSING METHOD AND STORAGE MEDIUM FOR PRINTING CHARACTER INCLUDING PLURALITY OF PARTS

CROSS-REFERENCE TO RELATED APPLICATIONS

This application is based upon and claims the benefit of priority from the prior Japanese Patent Application No. 2015-127122, filed on Jun. 24, 2015, and the entire contents of which are incorporated here in by reference.

BACKGROUND OF THE INVENTION

1. Field of the Invention

The disclosure relates to an information processing apparatus, a printing apparatus, an information processing method and a storage medium.

2. Description of Related Art

Regarding Thai character, one character is configured by a combination of a consonant letter indicative of a consonant and a symbol arranged in the vicinity of the consonant letter and indicating a vowel/intonation. A display apparatus configured to display Thai characters is disclosed in JP-A-2009-103736, for example. When a consonant letter and a symbol are input, the display apparatus combines the consonant letter and the symbol to configure and display a Thai character.

When deleting Thai character being displayed, the display apparatus of JP-A-2009-103736 deletes the same in reverse order to the input order of the consonant letter and the symbol. For this reason, when deleting one character, it is necessary to delete the consonant letter and the symbol configuring the character one by one and to operate a delete key more than once so as to delete one character, which requires time and effort. Also, since the character is deleted in reverse order to the input order, the consonant letter or the symbol, which is desired to remain, is also deleted depending on a position of the consonant letter or the symbol to be deleted. Therefore, it is necessary to re-input the consonant letter or the symbol. For this reason, the display apparatus cannot easily edit Thai characters. Also, when editing characters such as Arabic character and Hangul character, the display apparatus cannot also easily edit the characters, like Thai characters. This is also the same for a case where the characters such as Thai character are displayed and edited on an information processing apparatus such as a personal computer.

SUMMARY OF THE INVENTION

An information processing apparatus includes an input unit, a display unit, a designation unit and an update unit. The input unit inputs a plurality of parts configuring one character. The display unit displays the plurality of parts. The designation unit designates one or more parts selected from the plurality of parts by a user. The update unit updates a display on the display unit such that the designated one or more parts are deleted from the one character and the other parts are remained displayed on the display unit.

A printing apparatus includes an information processing apparatus and a printing unit. The information processing apparatus includes an input unit, a display unit, a designation unit and an update unit. The input unit inputs a plurality of parts configuring one character. The display unit displays the plurality of parts. The designation unit designates one or more parts selected from the plurality of parts by a user. The update unit updates a display on the display unit such that the designated one or more parts are deleted from the one character and the other parts are remained displayed on the display unit. The printing unit prints a character displayed by the display unit.

An information processing method comprising: inputting a plurality of parts configuring one character; displaying the plurality of parts; designating one or more parts selected from the plurality of parts by a user, and updating a display such that the designated one or more parts are deleted from the one character and the other parts are remained displayed.

A non-transitory computer-readable storage medium stores thereon a program executable by a computer of an information processing apparatus. The program controls the computer to perform functions comprising: inputting a plurality of parts configuring one character; displaying the plurality of parts; designating one or more parts selected from the plurality of parts by a user; and updating a display such that the designated one or more parts are deleted from the one character and the other parts are remained displayed.

BRIEF DESCRIPTION OF THE DRAWING

One skilled in the art can further understand the disclosure with reference to the below description and the drawings.

DETAILED DESCRIPTION OF THE PREFERRED EMBODIMENT

Figure 1:
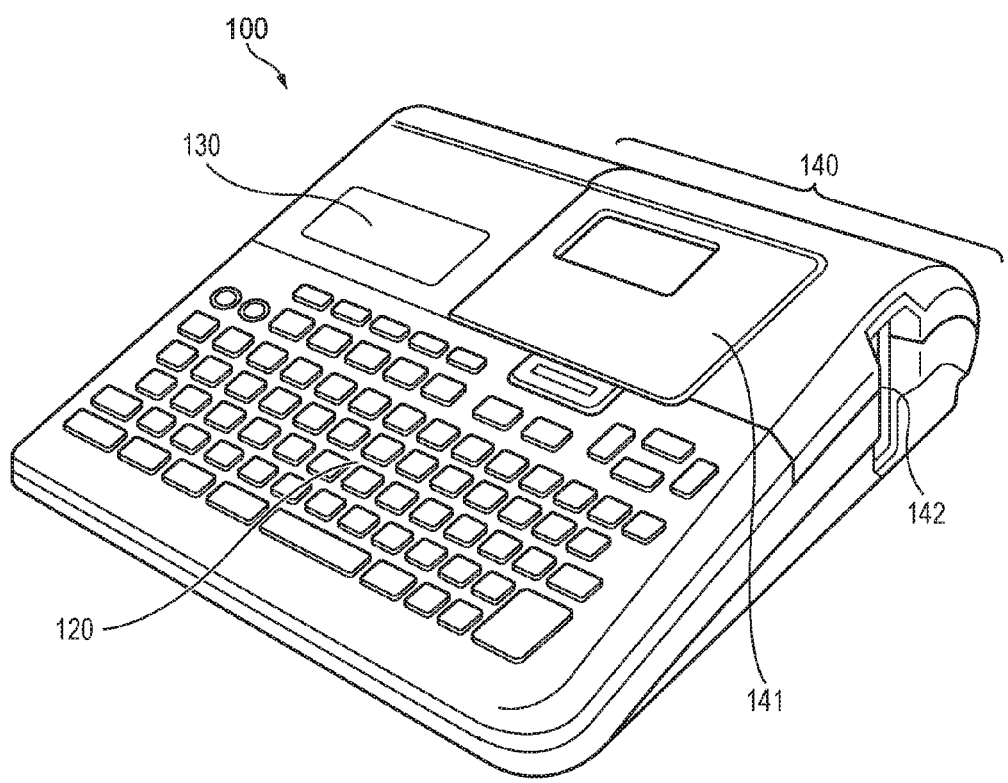
FIG. 1 depicts a label printer according to an illustrative embodiment of the disclosure.

Hereinafter, a label printer (a printing apparatus) according to an illustrative embodiment of the disclosure will be described with reference to the drawings. In the drawings, the same or corresponding parts are denoted with the same reference numerals.

As shown in FIG. 1, a label printer 100 of the illustrative embodiment has an input unit 120, a display 130 and a printing unit 140.

The label printer 100 is configured to display Thai characters input from the input unit 120 on the display 130. Also, the label printer 100 can edit the displayed Thai characters, based on an instruction input from the input unit 120. Also, the label printer 100 can print the displayed Thai characters on a label by the printing unit 140.

Figure 2:
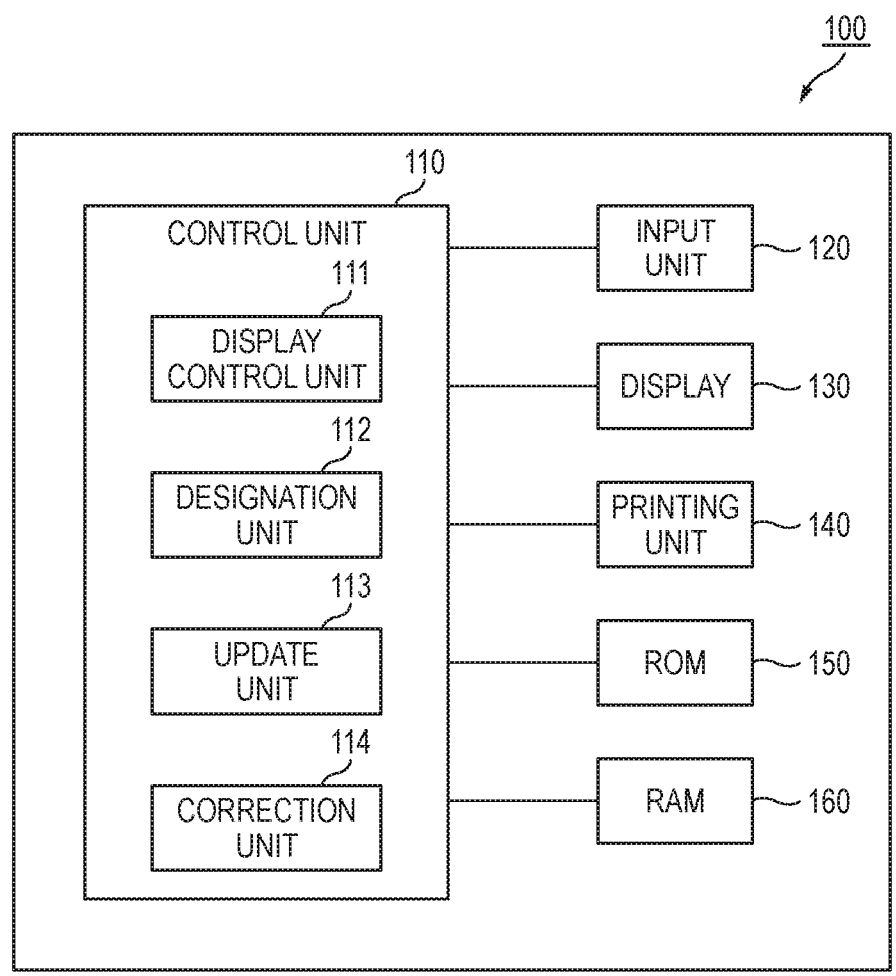
FIG. 2 is a block diagram depicting a configuration of the label printer according to the illustrative embodiment of the disclosure.

As shown in FIG. 2, the label printer 100 has, as an electrical configuration, a control unit 110, a ROM (Read Only Memory) 150 and a RAM (Random Access Memory) 160, in addition to the input unit 120, the display 130 and the printing unit 140.

The control unit 110 is configured by a CPU (Central Processing Unit) and the like. The control unit 110 is configured to execute software processing, in response to a program stored in the ROM 150, thereby implementing functions of the label printer 100 (which will be described later). The control unit 110 functions as a display control unit 111, a designation unit 112, an update unit 113 and a correction unit 114 by the configuration.

Figures 6, 7:
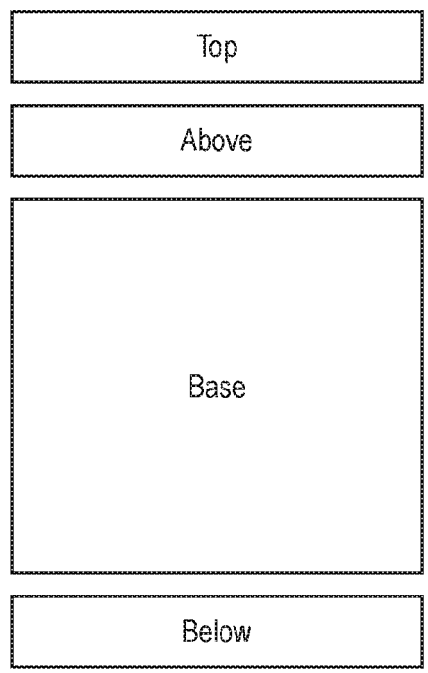
FIG. 6 depicts a configuration of Thai character.
FIG. 7 depicts parts of Thai characters.

As shown in FIGS. 8 and 9, the display control unit 111 is configured to display Thai characters on the display 130. Thai character is configured by combining parts corresponding to codes indicative of parts of Thai character input from the input unit 120. Specifically, regarding Thai character, one character is configured by a combination of a consonant letter indicative of a consonant and a symbol arranged in the vicinity of the consonant letter and indicating a vowel/intonation. In this illustrative embodiment, it is assumed that Thai character is configured by a combination of parts (the consonant letter and the symbol) and the parts include a main part and a subordinate part pertaining to the main part. As shown in FIG. 6, the main part is a character becoming Base. The subordinate part includes a symbol (Below) attached below the main part, a symbol (Above) attached above the main part and a symbol (Top) attached above the Above symbol. The main part is a consonant letter or symbol having no dotted circle in a table of FIG. 7, and the subordinate part is a symbol having a dotted circle attached thereto. Also, among the symbols having letters attached above the dotted circle, 0E48 to 0E4C (Unicode) indicate symbols to be inserted to Top. The other symbols having letters attached above the dotted circle are symbols to be inserted to Above. The symbols having letters attached below the circle are symbols to be inserted to Below.

Also, as shown in FIGS. 8 and 9, the display control unit 111 is configured to display a cursor, which indicates any one of parts configuring Thai character, on the display 130 by a dotted square. In the meantime, the display control unit 111 may be configured to display a part, which is indicated on the display 130 by the cursor, with a different color or contrasting density or to blink the part.

Returning to FIG. 2, the designation unit 112 is configured to instruct the display control unit 111 to move the cursor displayed on the display 130, in response to a user's input from the input unit 120, and to designate a part indicated by the cursor. Thereby, the designation unit 112 is configured to designate one or more parts, which are selected by the user, of a plurality of parts configuring one character, based on the user's operation.

The update unit 113 is configured to delete at least one part designated by the designation unit 112 from one Thai character, in response to a user's input from the input unit 120, and to instruct the display control unit 111 to display Thai character configured by a combination of the remaining parts (the other parts) on the display 130. Thereby, the update unit 113 is configured to delete the part designated by the designation unit 112, in response to the user's deletion operation, and to display the remaining parts on the display 130. Also, in this way, the update unit 113 is configured to delete one or more parts designated by the designation unit 112 and selected by the user, irrespective of a reverse order to an input order of the plurality of parts through the input unit 120. That is, the update unit 113 updates a display on the display 130 such that the designated one or more parts are deleted from the one character and the other parts are remained displayed on the display 130. Moreover, the update unit 113 updates the display on the display 130 such that the designated one or more parts are deleted, regardless of a reverse order to an order in which the plurality of parts are input by the input unit 120.

The correction unit 114 is configured to receive an input of codes indicative of parts of Thai character input by the user and to insert a part to a place from which the update unit 113 has deleted a part. The correction unit 114 is configured to instruct the display control unit 111 to display Thai character having the input parts added thereto on the display 130. Thereby, the correction unit 114 is configured to specify a position of one part of one or more parts deleted by the update unit 113 and selected by the user, to insert another part to the specified position of the one part and to combine and display the same with the remaining parts, which have not been deleted, on the display 130. That is, the correction unit 114 updates the display on the display unit such that a part that the user selected from the at least one part displayed on the display 130 is inserted in the specified position of the one part, the inserted part is combined with the other parts remained displayed, and the combined parts are displayed on the display 130. Moreover, the correction unit 114 specifies a position of one part of the one or more parts deleted from the one Thai character and updates the display on the display 130 such that another part is inserted in the specified position of the one part, the inserted part is combined with the other parts remained displayed, and the combined parts are displayed on the display 130.

The input unit 120 is an input device that is to be used so as to input codes of Thai character and to input operation information of the user to the label printer 100. Specifically, the input unit 120 is a keyboard of which keys are impressed thereon with Thai characters, for example. In the meantime, the input unit 120 may also be configured by a keyboard (a software keyboard) having Thai characters displayed on a touch panel, a touch panel configured to receive a handwriting input, or the like.

The display 130 is a display device configured to display Thai characters. Specifically, the display 130 is configured by a liquid crystal monitor having a resolution capable of displaying Thai characters, or the like.

As shown in FIG. 1, the printing unit 140 has a label storage unit 141 and a label discharge unit 142. The printing unit 140 is configured to print Thai characters displayed on the display 130 onto a label provided for the label storage unit 141 and to discharge the label having Thai characters printed thereon from the label discharge unit 142.

Returning to FIG. 2, the ROM 150 is configured by a non-volatile memory such as a flash memory, and stores therein the programs or data with which the control unit 110 implements the diverse functions, as described above. The RAM 160 is configured by a volatile memory, and is used as a work area in which the control unit 110 stores the programs for diverse processing. Also, the RAM 160 is configured to store codes indicative of parts of Thai characters input from the input unit 120.

In the below, a case where the user inputs Thai characters into the label printer 100 and edits the same is described. In this case, when the user inputs codes indicative of parts of Thai characters from the input unit 120, the label printer 100 displays the input Thai characters on the display 130. Also, when the user moves the cursor displayed on the display to a part of Thai character, which is to be deleted, and performs a deletion operation, the part indicated by the cursor can be deleted. The label printer 100 starts character editing processing shown in FIG. 3, in response to a user's operation of starting the character editing processing.

First, the control unit 110 determines whether data such as codes of Thai character, user's operation information or the like is input from the input unit 120 (step S101). When the data is not input from the input unit 120 (step S101; No), the control unit 110 repeats step S101 until the data is input.

When the data is input from the input unit 120 (step S101; Yes), the control unit 110 determines whether the input data is codes indicative of parts of Thai character (step S102). When the input data is codes indicative of parts of Thai character (step S102; Yes), the control unit 110 stores the input codes of Thai character in the RAM 160 and executes character input processing to be described later (step S103).

When the data input from the input unit 120 is not codes indicative of parts of Thai character (step S102; No), the update unit 113 determines whether the input data is data of a deletion instruction (step S104). When the input data is an input of a deletion instruction (step S104; Yes), the update unit 113 deletes a part indicated by the cursor (step S105). The data of a deletion instruction is input as a 'Delete' key of the keyboard is pressed, for example. Also, the update unit 113 inputs an instruction to display Thai character configured by combining the remaining parts on the display 130, to the display control unit 111.

After deleting the part indicated by the cursor or when the data input from the input unit 120 is not an input of the data of a deletion instruction (step S104; No), the designation unit 112 determines whether the input data is data for moving the cursor (step S106). When the input data is data for moving the cursor (S106; Yes), the designation unit 112 updates a position of the cursor, based on the input data (step S107). Specifically, the designation unit 112 outputs an instruction to update a position of the cursor displayed on the display 130, to the display control unit 111. The part indicated by the cursor is a part that is to be designated by the designation unit 112. The input for moving the cursor is made by pressing a 'Ctrl' key and a cursor key at the same time, for example.

After updating the position of the cursor or when the data input from the input unit 120 is not an input for moving the cursor (step S106; No), the control unit 110 determines whether the input data is data for moving an input cursor (step S108). When the input data is data for moving the input cursor (step S108; Yes), the control unit 110 updates the position of the input cursor, based on the input data for moving the input cursor (step S109). The input for moving the input cursor is made by an input through the cursor key, for example.

After updating the position of the input cursor or when the input data is not the data for moving the input cursor (step S108; No), the control unit 110 determines whether data of an ending instruction is input to the input unit 120 (step S110). When data of an ending instruction is input to the input unit 120 (step S110; Yes), the control unit 110 ends the character editing processing. When an ending instruction is not input to the input unit 120 (step S110; No), the control unit 110 returns to step S101. In this way, until the ending instruction is input, the processing of steps S101 to S109 is repeated, so that the processing of storing the codes indicative of the parts of Thai character in the RAM 160 on the basis of the input data, displaying Thai character corresponding to the stored codes and editing the displayed Thai characters is executed. Also, in the character editing processing, the control unit 110 executes processing of editing characters, rather than the input and deletion of the parts of the character in steps S101 to S109.

In the below, the character input processing (step S103) that is to be executed by the label printer 100 is described.

Figure 4:
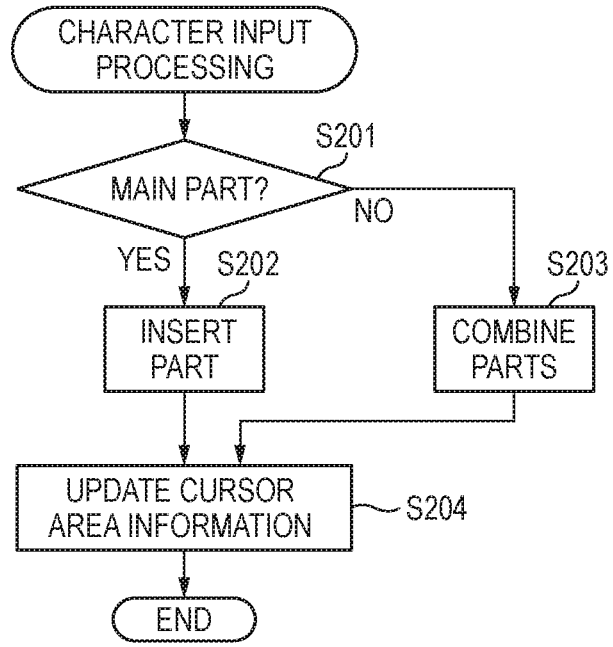
FIG. 4 is a flowchart depicting character input processing that is to be executed by the label printer according to the illustrative embodiment of the disclosure.

As shown in FIG. 4, the control unit 110 determines whether the code indicative of the part of the input Thai character is a code indicative of the main part or a code indicative of the subordinate part (step S201). Specifically, when the input code is a code of a part having no dotted circle of the table shown in FIG. 7, the control unit 110 determines that the code is a main part, and when the input code is a code of a part having a dotted circle, the control unit 110 determines that the code is a subordinate part.

When the code indicative of the part of the input Thai character is a code indicative of the main part (step S201; Yes), the display control unit 111 displays the main part at the right of the input cursor (step S202). Then, the display control unit 111 updates the position of the cursor (step S204). Specifically, the display control unit 111 moves the cursor so as to surround an area of the input main part. Also, the display control unit 111 moves the input cursor to the right of the inserted main part.

When the code indicative of the part of the input Thai character is a code indicative of the subordinate part (step S201; No), the display control unit 111 combines the input subordinate part with the main part to configure Thai character and displays the configured Thai character on the display 130 (step S203). In the meantime, the main part to be combined with the subordinate part is a left main part of the position of the input cursor. Then, the display control unit 111 updates the position of the cursor (step S204). Specifically, the display control unit 111 moves the cursor so as to surround an area including the subordinate part and the main part combined with the subordinate part. Also, the display control unit 111 does not change the position of the input cursor.

After the processing of step S204, the label printer ends the character input processing. Then, the label printer returns to the character editing processing and executes the processing of step S104.

In the below, a case where the user prints Thai characters on the label is described. In this case, the user displays Thai characters, which the user wants to print on the label, on the display 130 and enables the label printer 100 to execute printing processing.

Figure 5:
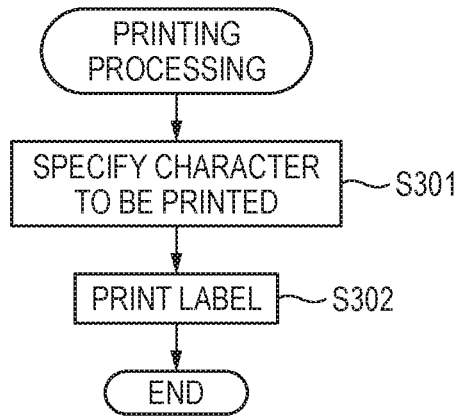
FIG. 5 is a flowchart depicting printing processing that is to be executed by the label printer according to the illustrative embodiment of the disclosure.

The label printer 100 starts the printing processing, in response to a user's operation of starting the printing processing. First, as shown in FIG. 5, the control unit 110 specifies Thai characters to be printed (step S301). Specifically, the control unit 110 specifies Thai characters edited in the character editing processing and displayed on the display 130, as Thai characters to be printed.

Then, the control unit 110 outputs an instruction to print Thai characters specified in step S301 on a label to the printing unit 140 (step S302). The printing unit 140 prints Thai characters specified in step S301 on a label stored in the label storage unit 141 and discharges the label having Thai characters printed thereon from the label discharge unit 142.

In the below, a specific example of the processing that is to be executed by the label printer 100 according to the illustrative embodiment is described with reference to FIGS. 8 and 9.

Figure 8A:
FIGS. 8A to 8G depict Thai characters that are to be displayed by the label printer according to the illustrative embodiment of the disclosure.
Figure 8B:
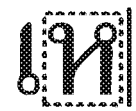
Figure 8C:
Figure 8D:
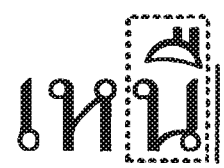
Figure 8E:
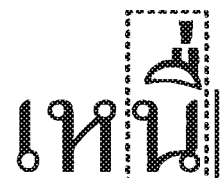
Figure 8F:
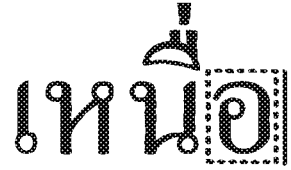
Figure 8G:
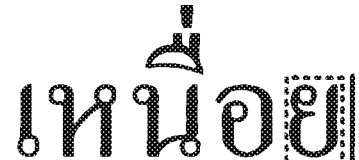

First, when inputting Thai characters shown in FIG. 8G, the user inputs the codes of the parts (the main parts and the subordinate parts) configuring the Thai characters from the input unit 120.

Figure 3:
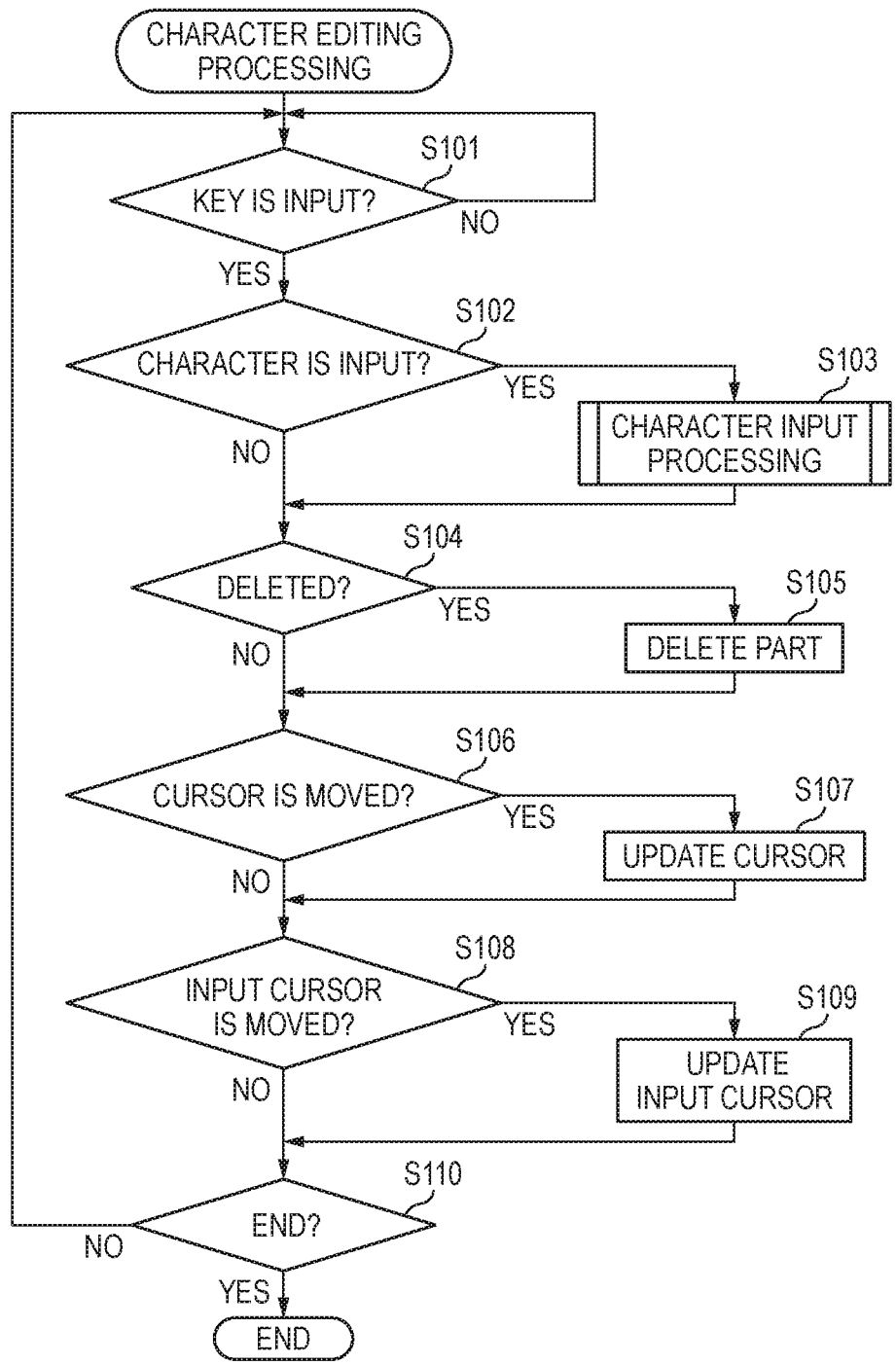
FIG. 3 is a flowchart depicting character editing processing that is to be executed by the label printer according to the illustrative embodiment of the disclosure.

The user inputs a code indicative of a part of a first Thai character shown in FIG. 8A from the input unit 120 of the label printer 100. The control unit 110 stores the code indicative of the part of the Thai character, which is input to the input unit 120 by the user, in the RAM 160 (step S103; FIG. 3). The control unit 110 determines whether the part of the Thai character is a main part or a subordinate part (step S201; FIG. 4). Since the part of the Thai character is a main part (step S201; Yes; FIG. 4), the control unit 110 inserts the part of the Thai character to the right of the input cursor indicated by a vertical line (step S202; FIG. 4). Then, the positions of the cursor and the input cursor are updated (step S204; FIG. 4). The cursor is displayed with a dotted square so as to surround the input part on the display 130. The input cursor is displayed with the vertical line at the right of the first character. In the meantime, the first character configures one character by one part.

Then, the user inputs a code indicative of a part (main part) of a second Thai character to the input unit 120. The control unit 110 stores the code indicative of the part of the Thai character, which is input to the input unit 120 by the user, in the RAM 160 (step S103; FIG. 3), like the part of the first Thai character. The second Thai character is displayed on the display 130, as shown in FIG. 8B. The cursor is displayed to surround the part of the second character. The input cursor is displayed with the vertical line at the right of the second character. In the meantime, the second character configures one character by one part.

Then, the user inputs a code indicative of a part (main part) of a third Thai character to the input unit 120. The control unit 110 stores the code indicative of the part of the Thai character, which is input to the input unit 120 by the user, in the RAM 160 (step S103; FIG. 3), like the part of the first Thai character. The third Thai character is displayed on the display 130, as shown in FIG. 8C. The cursor is displayed to surround the part of the third character. The input cursor is displayed with the vertical line at the right of the third character. In the meantime, the third character configures one character by a combination with two subordinate parts to be input later.

Then, the user inputs a code indicative of a part (first subordinate part) of the third Thai character to the input unit 120. The control unit 110 stores the code indicative of the part of the Thai character, which is input to the input unit 120 by the user, in the RAM 160 (step S103; FIG. 3). The control unit 110 determines whether the received part of the Thai character is a main part or a subordinate part (step S201; FIG. 4). Since the part is a subordinate part (step S201; No; FIG. 4), the control unit 110 combines the part (first subordinate part) of the Thai character with the main part of the third character (step S203; FIG. 4). The first subordinate part of the third character is combined at the Above position of the third character, as shown in FIG. 8D. Then, the positions of the cursor and the input cursor are updated (step S204; FIG. 4). The cursor is displayed to surround the main part and the first subordinate part. The input cursor is displayed with the vertical line at the right of the third character.

Then, the user inputs a code indicative of a part (second subordinate part) of the third Thai character to the input unit 120. The control unit 110 stores the code indicative of the part of the Thai character, which is input to the input unit 120 by the user, in the RAM 160 (step S103; FIG. 3). The control unit 110 determines whether the part of the Thai character is a main part or a subordinate part (step S201; FIG. 4). Since the part of the Thai character is a subordinate part (step S201; No; FIG. 4), the control unit 110 combines the part (second subordinate part) of the Thai character with the main part of the third character (step S203; FIG. 4). The part (second subordinate part) of the third character is combined at the Top position of the third character, as shown in FIG. 8E. Then, the positions of the cursor and the input cursor are updated (step S204; FIG. 4). The cursor is displayed to surround the main part, the first subordinate part and the second subordinate part. The input cursor is displayed with the vertical line at the right of the third character.

Then, the user inputs a code indicative of a part (main part) of a fourth Thai character to the input unit 120. The input Thai character is displayed on the display 130, as shown in FIG. 8F. The cursor is displayed to surround the part of the fourth character. The input cursor is displayed with the vertical line at the right of the fourth character.

Then, the user inputs a code indicative of a part (main part) of a fifth Thai character to the input unit 120. The input Thai character is displayed on the display 130, as shown in FIG. 8G. The cursor is displayed to surround the part of the fifth character. The input cursor is displayed with the vertical line at the right of the fifth character.

Figure 9A:
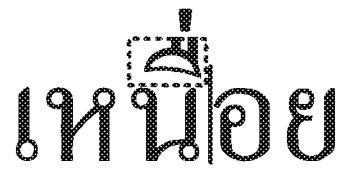
FIGS. 9A to 9D depict Thai characters that are to be displayed by the label printer according to the illustrative embodiment of the disclosure.
Figure 9B:
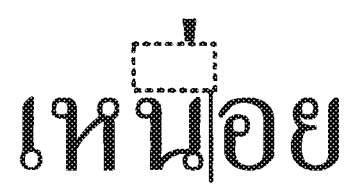

In the below, a case where the user deletes a part of Thai character is described. The user moves the cursor to a position of a part of Thai character, which the user wants to delete (step S107; FIG. 3). For example, when the user wants to delete the Above part of the third character, the user moves the cursor to the Above part of the third character, as shown in FIG. 9A. The part indicated by the cursor is a part that is to be designated by the designation unit 112. The cursor is moved by an operation of pressing the 'Ctrl' key and the cursor key of the input unit 120 at the same time, for example. Then, the user performs a deletion operation through the input unit 120 (step S105; FIG. 3). When the user performs a deletion operation, the part designated by the designation unit 112 (indicated by the cursor) is deleted, as shown in FIG. 9B. The deletion operation is an input of the 'Delete' key, for example. Also, in the state of FIG. 9B, when the user input a part of Thai character, which can be input to the deleted place, the correction unit 114 inputs the input part to the part-deleted place.

Figure 9C:
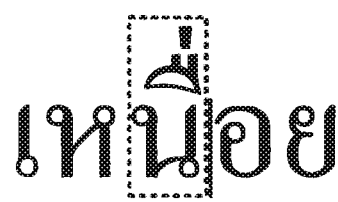
Figure 9D:

In the below, a case where the user deletes one character of Thai character is described. The user moves the cursor to a position of a character, which the user wants to delete (step S107; FIG. 3). For example, the user moves the cursor to the position of the third character. Specifically, the user operates the cursor key from the input unit 120 to move the input cursor to the right of the third character. When the input cursor is moved to the right of the third character, the cursor is moved to indicate the entire third character, as shown in FIG. 9C. The part indicated by the cursor is a part that is to be designated by the designation unit 112. Then, the user performs a deletion operation through the input unit 120 (step S105; FIG. 3). When the user performs a deletion operation, the part designated by the designation unit 112 (indicated by the cursor) is deleted, as shown in FIG. 9D. Then, the positions of the cursor and the input cursor are updated. The cursor is displayed to surround the Thai character (only the main part, in this example) positioned at the left of the deleted character. The input cursor is displayed with the vertical line at the right of the Thai character surrounded by the cursor.

As described above, when editing the characters of a language in which a plurality of parts is combined to configure one character, the label printer 100 of this illustrative embodiment can designate any part, which the user wants to delete, by the cursor. For this reason, the part to be deleted becomes clear, so that it is possible to reduce a labor of deleting an unintended part and re-inputting the same. Therefore, for example, when a wrong part is input due to a typing mistake, it is possible to easily delete the wrong part, so that it is possible to effectively edit the characters. Also, a character consisting of a plurality of parts is designated for each character and one character can be deleted by the one-time deletion operation, so that it is possible to effectively delete the character. As a result, even when a display range of the display 130 of the label printer 100 is narrow, it is possible to effectively input and delete the characters.

Modified Embodiments

In the above illustrative embodiment, the label printer 100 has been exemplified as the information processing apparatus. However, the information processing apparatus is not particularly limited inasmuch as it can input and edit the codes of the parts of the characters. For example, the information processing apparatus may be a portable information terminal such as a smart phone, a personal computer or the like.

In the above illustrative embodiment, the label printer 100 edits the received Thai characters and prints the edited Thai characters. However, the label printer 100 can be applied to any character rather than Thai character inasmuch as one character consists of a plurality of parts. For example, the label printer 100 can also be applied to Hangul character, Arabic character and the like. Also, the label printer 100 can be applied to Japanese by treating a voiced sound symbol/a semi-voiced sound symbol of Japanese as parts configuring a character. Also, the label printer 100 can be applied to Western languages such as German and French by treating Umlaut, an acute accent and the like of the Western languages as parts configuring a character.

Figure 10A:
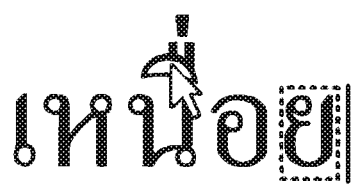
FIGS. 10A to 10D depict Thai characters that are to be displayed by the label printer according to the illustrative embodiment of the disclosure.
Figure 10B:
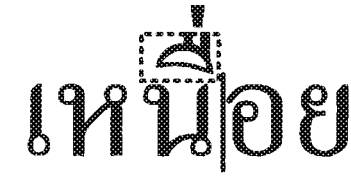
Figure 10C:
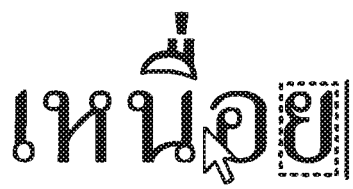
Figure 10D:
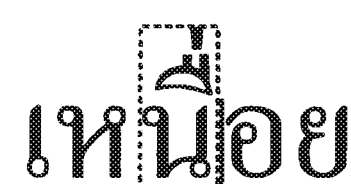

According to the label printer 100, the cursor is moved by the cursor key of the input unit 120. However, the cursor may be moved by using a touch panel or a pointing device. In this case, as shown in FIG. 10A, when a mouse pointer is clicked with being matched to a part of a character, the part clicked with the mouse pointer may be indicated by the cursor, as shown in FIG. 10B. Also, as shown in FIG. 10C, when the mouse pointer is clicked between characters, one character at the left of the place clicked with the mouse pointer may be indicated by the cursor, as shown in FIG. 10D.

Figure 11:
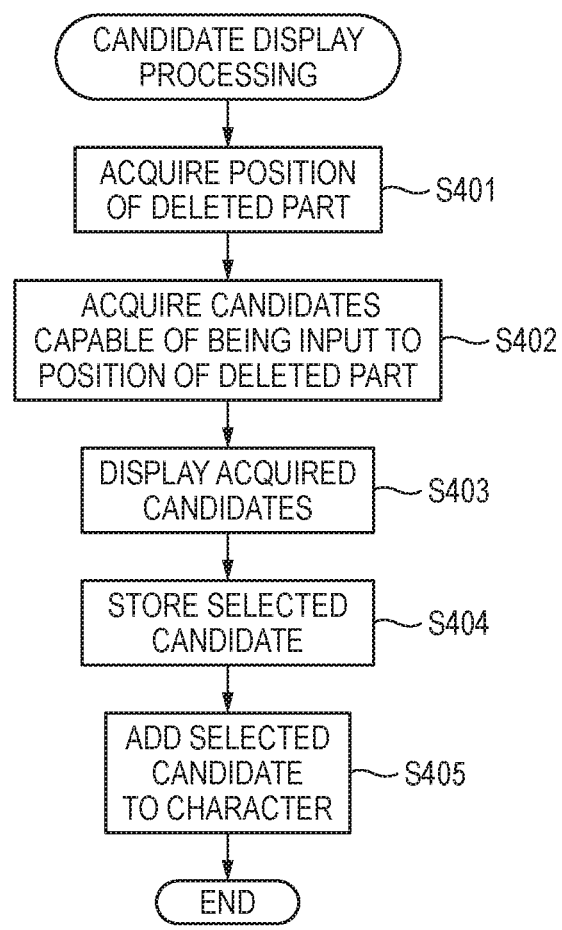
FIG. 11 is a flowchart depicting candidate display processing that is to be executed by the label printer according to the illustrative embodiment of the disclosure.

Also, the label printer 100 may have a candidate display unit configured to display candidates of a part, which is to be inserted to a position of a deleted part, on the display 130 so as to insert another part to the position of the deleted part after deleting the part. In this case, the label printer 100 starts candidate display processing when a part of a character is deleted. As shown in FIG. 11, the candidate display unit first acquires position information of the deleted part (step S401). For example, as shown in FIG. 9B, when the part of the Above position of the third character is deleted, the candidate display unit acquires Above of the third character, as the position information. Returning to FIG. 11, the candidate display unit acquires candidate information of parts that can be input to the position of the deleted part (step S402). The candidate display unit has a candidate table (a first candidate table) in which positions (Base, Below, Above, Top) capable of being input are stored for each of the plurality of parts stored therein, and extracts parts, which can be input to the position of the deleted part, from the candidate table. In the example of FIG. 9B, the candidate display unit extracts parts that can be input to the Above position stored in the candidate table. Also, information of a priority order for each part may be stored in the candidate table and candidates of parts may be displayed with a sequence of the priority order. The priority order is determined on the basis of a frequency that a corresponding part is input with being combined a part of a character, which has not been deleted. Then, the display control unit 111 displays the candidates of the parts extracted by the candidate display unit on the display 130 (step S403). In this way, the candidate display unit is configured to specify a position of one part of one or more parts deleted by the update unit 113, to extract parts, which can be input to the specified position of the one part, from the candidate table in which positions capable of being input for each part are stored, and to display the extracted parts on the display 130. Then, the correction unit 114 stores a code of a part, which is selected by the user from the candidates of the displayed parts, in the RAM 160 (step S404). Then, the correction unit 114 outputs an instruction to insert the selected part to the position from which the part has been deleted and to display a character configured by combining parts on the display 130 to the display control unit 111 (step S405). Specifically, the received candidate is inserted to the place of the dotted square shown in FIG. 9B and is displayed on the display 130. In this way, the correction unit 114 is configured to insert a part, which is selected by the user from the parts displayed by the candidate display unit, to a position of one part, to combine the part with the remaining undeleted parts (remained displayed parts) and to display the same on the display 130. Then, the label printer ends the candidate display processing and returns to the character editing processing.

Also, in this modified embodiment, the candidate display unit may have a second candidate table in which parts capable of being combined with the remaining undeleted parts to configure characters are stored for each of the plurality of the other parts stored therein, and may be configured to extract a part, which can be input to a position of a deleted part, from the second candidate table. Also in this case, the display control unit 111 may be configured to display candidates of parts extracted by the candidate display unit on the display 130. In this way, the candidate display unit may be configured to specify a position of one part of one or more parts deleted by the update unit 113, to extract a part capable of being input to the specified position of the one part from the second candidate table in which parts capable of being combined with the remaining undeleted parts to configure characters are stored, and to display the extracted part on the display 130.

Figure 12A:
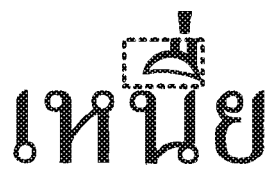
FIGS. 12A to 12F depict Thai characters that are to be displayed by the label printer according to the illustrative embodiment of the disclosure.
Figure 12B:
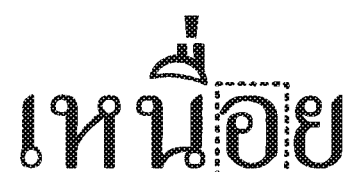
Figure 12C:
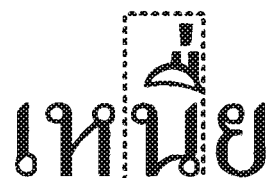
Figure 12D:
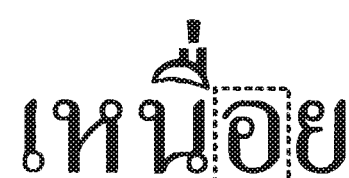

In the above illustrative embodiment, the label printer 100 is configured to display Thai characters, the cursor and the input cursor on the display 130. However, the label printer 100 may be configured to display Thai characters and the cursor on the display 130 without displaying the input cursor, as shown in FIG. 12. In this case, when the label printer 100 receives an input of a part of Thai character, the label printer inserts the received part of Thai character to the right of a character indicated by the cursor. For example, as shown in FIG. 12A, when an input of a part of a character is received at a state where the cursor is located at the Above position of a third character, a character is inserted to the right of the third character, as shown in FIG. 12B. Also, as shown in FIG. 12C, when an input of a part of a character is received at a state where the cursor is located at the entire position of the third character, a character is inserted to the right of the third character, as shown in FIG. 12D. The cursor serves as the input cursor, too, so that the input cursor is not displayed and the visualization of the character can be thus improved.

Figure 12E:
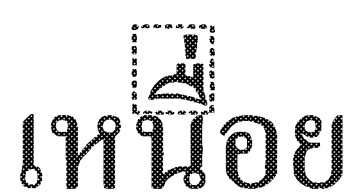
Figure 12F:
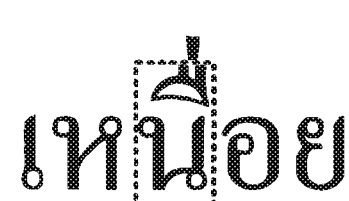

In the above illustrative embodiment, the designation unit 112 of the label printer 100 is configured to designate the parts of Thai character individually. However, the designation unit 112 may be configured to designate a plurality of parts. For example, as shown in FIG. 12E, the designation unit 112 may be configured to designate parts located at the Above and Top positions of the third character, as a part to be deleted. Also, as shown in FIG. 12F, the designation unit 112 may be configured to designate parts located at the Base and Above positions of the third character, as a part to be deleted. In this way, it is possible to improve the editing efficiency by designating a plurality of parts, as a part to be deleted.

Also, the character editing processing and printing processing, which are to be executed by the information processing apparatus consisting of the CPU, the RAM, the ROM and the like, may be executed using a usual portable information terminal, a personal computer and the like, irrespective of a dedicated system. For example, an information terminal configured to execute the above-described processing may be configured by distributing a computer program for executing the above-described operations with being stored in a computer-readable recording medium (a flexible disk, a CD-ROM (Compact Disc Read Only Memory), a DVD-ROM (Digital Versatile Disc Read Only Memory) or the like) and installing the same in the portable information terminal and the like. Also, the information processing apparatus may be configured by storing the computer program in a storage device of a server apparatus on a communication network such as Internet and downloading the same through a usual information processing terminal or the like.

Also, when the functions of the information processing apparatus are implemented by assignation of an OS (Operating System) and an application program or cooperation of the OS and the application program, for example, only the application program may be stored in the recording medium or the storage device.

Also, the computer program may be superimposed on carrier waves and transmitted through a communication network. For example, the computer program may be posted on a bulletin board (BBS: Bulletin Board System) on the communication network and transmitted through the network. Also, the above-described processing may be executed by activating the computer program and executing the same under control of the OS, like the other application programs.

Although the preferred illustrative embodiments of the disclosure have been described, the disclosure is not limited to the specific illustrative embodiments and includes the invention defined in the claims and the equivalents thereto.

What is claimed is:

1. An information processing apparatus comprising:
an input device configured to input an initial plurality of parts;
a display device configured to display the initial plurality of parts; and
a processor configured to:
designate one or more parts selected from the initial plurality of parts by a user;
update a display on the display device such that the one or more parts designated are deleted from the initial plurality of parts and other parts of the initial plurality of parts remain displayed on the display device;
when another part different from the one or more parts deleted is to be inserted to a position of one part of the one or more parts deleted:
specify a position category of the position of the one part of the one or more parts deleted;
extract at least one stored part belonging to the position category specified from a first candidate table, wherein the first candidate table is configured to store a plurality of stored parts and corresponding position categories, wherein each corresponding position category indicates a position which allows each stored part to be inserted; and
update the display device to display the at least one part extracted on the display device as at least one candidate to be inserted to the position of the one part of the one or more parts deleted; and
control a printing device to print a character including the another part to be inserted and the other parts of the initial plurality of parts that remain displayed by the display device.

2. The information processing apparatus according to claim 1,
wherein the processor is configured to update the display on the display device such that the one or more parts designated are deleted, regardless of a reverse order to an order in which the initial plurality of parts are input by the input device.

3. The information processing apparatus according to claim 1,
wherein the processor is configured to:
control the display device to display a cursor; and
designate the one or more parts by moving the cursor displayed on the display device based on a user operation to select the one or more parts.

4. The information processing apparatus according to claim 1,
wherein the processor is configured to:
specify the position of the one part of the one or more parts deleted;
extract at least one stored part from a second candidate table, wherein the second candidate table is configured to store, for each of the other parts of the initial plurality of parts that remain displayed on the display device, at least one stored part capable of being combined with the other parts to configure another character; and
update the display on the display device to display the at least one stored part extracted from the second candidate table.

5. The information processing apparatus according to claim 1,
wherein the processor is configured to:
update the display on the display device such that a part that the user selects from the at least one candidate displayed on the display device is inserted in the position of the one part of the one or more parts deleted;
combine the part that is inserted with the other parts of the initial plurality of parts that remain displayed on the display device to form combined parts; and update the display on the display device to display the combined parts.

6. A printing apparatus comprising:
an information processing apparatus comprising:
- an input device configured to input an initial plurality of parts;
- a display device configured to display the initial plurality of parts;
- a processor configured to:
  - designate one or more parts selected from the initial plurality of parts by a user;
  - update a display on the display device such that the one or more parts designated are deleted from the initial plurality of parts and other parts of the initial plurality of parts remain displayed on the display device; and
  - when another part different from the one or more parts deleted is to be inserted to a position of one part of the one or more parts deleted:
    - specify a position category of the position of the one part of the one or more parts deleted;
    - extract at least one stored part belonging to the position category specified from a first candidate table, wherein the first candidate table is configured to store a plurality of stored parts and corresponding position categories, wherein each corresponding position category indicates a position which allows each stored part to be inserted; and
    - update the display device to display the at least one part extracted on the display device as at least one candidate to be inserted to the position of the one part of the one or more parts deleted; and
- a printing device configured to print a character including the another part to be inserted and the other parts of the initial plurality of parts that remain displayed by the display device.

7. The printing apparatus according to claim 6, wherein the processor is configured to update the display on the display device such that the one or more parts designated are deleted, regardless of a reverse order to an order in which the initial plurality of parts are input by the input device.

8. The printing apparatus according to claim 6, wherein the processor is configured to:
- control the display device to display a cursor; and
- designate the one or more parts by moving the cursor displayed on the display device based on a user operation to select the one or more parts.

9. The printing apparatus according to claim 6, wherein the processor is configured to:
- update the display on the display device such that a part that the user selects from the at least one candidate displayed on the display device is inserted in the position of the one part of the one or more parts deleted;
- combine the part that is inserted with the other parts of the initial plurality of parts that remain displayed on the display device to form combined parts; and
- update the display on the display device to display the combined parts.

10. An information processing method comprising:
receiving an input of an initial plurality of parts;
displaying the initial plurality of parts;
designating one or more parts selected from the initial plurality of parts by a user;
updating a display on a display device such that the one or more parts designated are deleted from the initial plurality of parts and other parts of the initial plurality of parts remain displayed on the display device;
when another part different from the one or more parts deleted is to be inserted to a position of one part of the one or more parts deleted:
- specifying a position category of the position of the one part of the one or more parts deleted;
- extracting at least one stored part belonging to the position category specified from a first candidate table, wherein the first candidate table is configured to store a plurality of stored parts and corresponding position categories, wherein each corresponding position category indicates a position which allows each stored part to be inserted; and
- updating the display device to display the at least one part extracted on the display device as at least one candidate to be inserted to the position of the one part of the one or more parts deleted; and controlling a printing device to print a character including the another part to be inserted and the other parts of the initial plurality of parts that remain displayed by the display device.

11. The information processing method according to claim 10,
wherein the updating updates the display on the display device such that the one or more parts designated are deleted, regardless of a reverse order to an order in which the initial plurality of parts are input.

12. The information processing method according to claim 10, further comprising:
controlling the display device to display a cursor; and
designating the one or more parts by moving the cursor displayed on the display device based on a user operation to select the one or more parts.

13. The information processing method according to claim 10, further comprising:
updating the display on the display device such that a part that the user selects from the at least one candidate displayed on the display device is inserted in the position of the one part of the one or more parts deleted;
combining the part that is inserted with the other parts of the initial plurality of parts that remain displayed on the display device to form combined parts; and
updating the display on the display device to display the combined parts.

14. A non-transitory computer-readable storage medium having stored thereon a program executable by a computer of an information processing apparatus, the program controlling the computer to perform functions comprising:
receiving an input of an initial plurality of parts;
displaying the initial plurality of parts;
designating one or more parts selected from the initial plurality of parts by a user;
updating a display on a display device such that the one or more parts designated are deleted from the initial plurality of parts and other parts of the initial plurality of parts remain displayed on the display device;
when another part different from the one or more parts deleted is to be inserted to a position of one part of the one or more parts deleted:
- specifying a position category of the position of the one part of the one or more parts deleted;
- extracting at least one stored part belonging to the position category specified from a first candidate table, wherein the first candidate table is configured to store a plurality of stored parts and corresponding position categories, wherein each corresponding position category indicates a position which allows each stored part to be inserted; and updating the display device to display the at least one part extracted on the display device as at least one candidate to be inserted to the position of the one part of the one or more parts deleted; and controlling a printing device to print a character including the another part to be inserted and the other parts of the initial plurality of parts that remain displayed by the display device.

15. The storage medium according to claim 14,
wherein the updating updates the display on the display device such that the one or more parts designated are deleted, regardless of a reverse order to an order in which the initial plurality of parts are input.

16. The storage medium according to claim 14,
wherein the program further controls the computer to perform functions comprising:

controlling the display device to display a cursor; and designating the one or more parts by moving the cursor displayed on the display device based on a user operation to select the one or more parts.

17. The storage medium according to claim 14,
wherein the program further controls the computer to perform functions comprising:

updating the display on the display device such that a part that the user selects from the at least one candidate displayed on the display device is inserted in the position of the one part of the one or more parts deleted;

combining the part that is inserted with the other parts of the initial plurality of parts that remain displayed on the display device to form combined parts; and updating the display on the display device to display the combined parts.

* * * * *